US010875044B2

(12) United States Patent
Taylor et al.

(10) Patent No.: US 10,875,044 B2
(45) Date of Patent: Dec. 29, 2020

(54) CONTROLLER FOR A ROBOTIC DEVICE FOR APPLYING AN INSULATING LAYER

(71) Applicant: Q-Bot Limited, Bendon Valley (GB)

(72) Inventors: Daniel Taylor, London (GB); Matthew Holloway, London (GB); Miguel Julia Cristobal, Munich (DE); Thomas Lipinski, London (GB)

(73) Assignee: Q-Bot Limited, Bendon Valley (GB)

( * ) Notice: Subject to any disclaimer, the term of this patent is extended or adjusted under 35 U.S.C. 154(b) by 316 days.

(21) Appl. No.: 15/738,317

(22) PCT Filed: Jun. 22, 2016

(86) PCT No.: PCT/GB2016/051865
§ 371 (c)(1),
(2) Date: Dec. 20, 2017

(87) PCT Pub. No.: WO2016/207627
PCT Pub. Date: Dec. 29, 2016

(65) Prior Publication Data
US 2018/0169685 A1 Jun. 21, 2018

(30) Foreign Application Priority Data
Jun. 22, 2015 (GB) .................................. 1510976.2

(51) Int. Cl.
*G05B 19/00* (2006.01)
*B05B 13/00* (2006.01)
(Continued)

(52) U.S. Cl.
CPC .......... *B05B 13/005* (2013.01); *B05B 12/122* (2013.01); *B05B 13/0431* (2013.01);
(Continued)

(58) Field of Classification Search
CPC . B05B 13/005; B05B 12/122; B05B 13/0431; B05B 12/00; B05B 13/04;
(Continued)

(56) References Cited

U.S. PATENT DOCUMENTS

| 4,407,035 A | 10/1983 | Lindqvist |
| 4,817,653 A | 4/1989 | Krajicek et al. |

(Continued)

FOREIGN PATENT DOCUMENTS

| CN | 2900292 Y | 5/2007 |
| DE | 102014010869 A1 | 1/2015 |

(Continued)

OTHER PUBLICATIONS

Holloway, Mathew, Miguel Julia, and Peter Childs. "A robot for spray applied insulation in underfloor voids." Proceedings of ISR 2016: 47st International Symposium on Robotics. VDE, 2016. (Year: 2016).*

(Continued)

*Primary Examiner* — Michael D Masinick
(74) *Attorney, Agent, or Firm* — Seyfarth Shaw LLP

(57) ABSTRACT

A robotic vehicle, in particular for spraying insulation material, comprises a chassis (110), at least two driven wheels (122) having a common axis of rotation, and a wheel connecting member (151) which connects the two wheels (122). The wheel connecting member (151) is connected to the chassis by a pivotal connection which allows the wheel connecting member to pivot with respect to the chassis about a pivoting axis transverse to the common axis of rotation of the wheels. The wheel connecting member (151) may be removably mounted to the chassis (110).

11 Claims, 15 Drawing Sheets

(51) Int. Cl.
*B05B 12/12* (2006.01)
*B05B 13/04* (2006.01)
*B25J 5/00* (2006.01)
*B25J 11/00* (2006.01)
*E04F 21/08* (2006.01)
*B25J 13/06* (2006.01)
*B25J 15/00* (2006.01)
*B25J 19/02* (2006.01)
*B62D 7/02* (2006.01)
*E04B 1/76* (2006.01)

(52) U.S. Cl.
CPC ........... *B25J 5/007* (2013.01); *B25J 11/0075* (2013.01); *B25J 13/06* (2013.01); *B25J 15/0019* (2013.01); *B25J 19/022* (2013.01); *B62D 7/02* (2013.01); *E04B 1/76* (2013.01); *E04F 21/085* (2013.01); *Y10S 901/01* (2013.01); *Y10S 901/09* (2013.01); *Y10S 901/43* (2013.01); *Y10S 901/47* (2013.01)

(58) Field of Classification Search
CPC ...... B25J 13/06; B25J 15/0019; B25J 19/022; B25J 5/007; B25J 11/0075; B62D 7/02; E04B 1/76; E04F 21/085; Y10S 901/01; Y10S 901/09; Y10S 901/43; Y10S 901/47; B60G 5/025; B60G 2200/32
See application file for complete search history.

(56) References Cited

U.S. PATENT DOCUMENTS

| | | | |
|---|---|---|---|
| 5,338,247 A | 8/1994 | Miles | |
| 5,358,568 A * | 10/1994 | Okano | B05B 13/005 118/323 |
| 5,465,525 A * | 11/1995 | Mifune | A01M 7/00 43/132.1 |
| 5,561,883 A | 10/1996 | Landry et al. | |
| 5,873,586 A | 2/1999 | Krimmell | |
| 6,000,484 A * | 12/1999 | Zoretich | B05B 13/005 180/21 |
| 6,210,753 B1 * | 4/2001 | Vohs | B05D 3/12 427/244 |
| 8,875,655 B2 * | 11/2014 | Pettersson | B05B 12/122 118/713 |
| 9,844,792 B2 * | 12/2017 | Pettersson | B05B 12/122 |
| 10,478,972 B2 * | 11/2019 | Lipinski | B05B 13/0405 |
| 2012/0195724 A1 | 8/2012 | Toebes | |
| 2012/0219699 A1 * | 8/2012 | Pettersson | B05B 12/124 427/8 |
| 2014/0076985 A1 * | 3/2014 | Pettersson | B05B 7/0846 239/11 |
| 2014/0123800 A1 | 5/2014 | Choi | |
| 2014/0242285 A1 * | 8/2014 | Pettersson | B05B 12/00 427/427.2 |

FOREIGN PATENT DOCUMENTS

| | | |
|---|---|---|
| EP | 2641661 | 9/2013 |
| EP | 2641661 A1 | 9/2013 |
| EP | 2799150 A1 | 11/2014 |
| EP | 3023124 A | 5/2016 |
| GB | 2516545 A | 1/2015 |
| GB | 2535817 A | 8/2016 |
| GB | 2538122 A | 11/2016 |
| JP | 63195068 A | 8/1988 |
| JP | H06147875 | 5/1994 |
| KR | 20000073460 A | 12/2000 |
| WO | 9726048 A1 | 7/1997 |
| WO | 2006007706 | 1/2006 |
| WO | 2012038446 | 3/2012 |
| WO | 2013059515 A1 | 4/2013 |
| WO | 2014188221 A2 | 11/2014 |
| WO | 2015006917 A1 | 1/2015 |
| WO | 2015059241 A1 | 4/2015 |
| WO | 2015192900 A1 | 12/2015 |

OTHER PUBLICATIONS

International Preliminary Report on Patentability for International Application No. PCT/GB2016/051865 dated Jan. 4, 2018, 1 page.
Written Opinion for International Application No. PCT/GB2016/051865 dated Jan. 4, 2018, 12 pages.
International Search Report for International Application No. PCT/GB2016/051865 dated Jan. 23, 2017, 9 pages.
Written Opinion for International Application No. PCT/GB2016/051865 dated Jan. 23, 2017, 12 pages.
Search and Examination Report for Application No. GB1510976.2 dated Jan. 14, 2016, 8 pages.
Search Report for Application No. GB1510976.2 dated Mar. 31, 2017, 3 pages.
Search Report for Application No. GB1510976.2 dated Mar. 31, 2017, 2 pages.
European Office Action for Application No. 16732705.5 dated Jan. 24, 2020, 2 pages.
United Kingdom Combined Search and Examination Report for Application No. GB1906389.0 dated Jul. 18, 2019, 5 pages.
European Office Action for Application No. 16732705.5 dated Oct. 23, 2020, 6 pages.

* cited by examiner

US 10,875,044 B2

CONTROLLER FOR A ROBOTIC DEVICE FOR APPLYING AN INSULATING LAYER

CROSS REFERENCE TO RELATED APPLICATIONS

This application is a U.S. National Stage Application of, and claims priority to, International Application No. PCT/GB2016/051865, filed Jun. 22, 2016, which claims priority to Great Britain Patent Application Serial No. 1510976.2, filed Jun. 22, 2015, the disclosures of which are incorporated herein by reference.

This invention relates to a robotic vehicle, in particular a robotic vehicle suitable for spraying insulation material on a surface of an enclosed space.

BACKGROUND

Our prior application WO 2014/188221 discloses robots for spraying expandable foam material. The present application relates to developments of such robots.

BRIEF SUMMARY OF THE DISCLOSURE

Viewed from a first aspect, the present invention provides a robotic vehicle, in particular for spraying insulation material. The vehicle comprises a chassis, at least two driven wheels having a common axis of rotation, and a wheel connecting member which connects the two wheels. The wheel connecting member is connected to the chassis by a pivotal connection which allows the wheel connecting member to pivot with respect to the chassis about a pivoting axis transverse to the common axis of rotation of the wheels.

Thus, the present invention provides a simple suspension system which allows the robotic vehicle to negotiate obstacles.

The pivoting axis may intersect the common axis of rotation of the wheels. In some embodiments of the invention, however, the pivoting axis is offset from the common axis of rotation of the wheels.

The robotic vehicle may comprise two more wheels connected by a further wheel connecting member and connected to the chassis at an opposite end thereof to the driven wheels, the further connecting member being mounted to the chassis for rotation therewith. Thus, the vehicle may comprise a pair of fixed wheels whose common axis of rotation does not change with respect to the chassis and a pair of wheels whose common axis of rotation can rotate with respect to the chassis. For example, the front wheels of the robotic vehicle may be fixed and the rear wheels may be mounted on a wheel connecting member that can rotate with respect to the chassis. The fixed wheels may be driven or freewheeling. In the presently preferred embodiment, all of the wheels of the robotic vehicle are driven.

In embodiments of the invention, the wheel connecting member is removably mounted to the chassis. For example, the pivotal connection may connect the wheel connecting member to a wheel mounting member and the wheel mounting member may be removably mounted to the chassis.

Viewed from a further aspect therefore, the invention provides a robotic vehicle, in particular for spraying insulation material, the vehicle comprising a chassis, at least two driven wheels having a common axis of rotation, and a wheel connecting member which connects the two wheels, wherein the wheel connecting member is removably mounted to the chassis.

Providing removably mounted wheels on the chassis allows the wheels to be removed when the robotic vehicle is introduced into a working space, which means that the robotic vehicle can be introduced through an aperture that is smaller than the assembled robotic vehicle. In addition, the removably mounted wheel connecting member allows the wheels (or chassis) to be changed easily to suit the environment in which the vehicle is to operate or the task to be undertaken.

Removable mounting may be achieved by any suitable mechanism. For example, interengaging members may be provided to connect the wheel connecting member to the chassis. Suitable interengaging members may comprise holes and pins, for example. A securing mechanism may be provided. For example screw fitting may be provided to secure the wheel connecting member to the chassis.

The chassis may comprise a first electrical connector for supplying electrical power to the wheels. The wheel connecting member (or a wheel mounting member connected thereto) may comprise a complementary second electrical connector arranged to connect to the first electrical connector when the wheel connecting member is connected to the chassis, whereby to supply electrical power from the chassis to the wheels. In this way, both a mechanical and an electrical connection can be made between the wheels and the chassis.

The chassis may have a longitudinal axis which is transverse to the common axis of rotation of the wheels in normal operation of the vehicle. The wheel connecting member may be connected to the chassis by a first linkage and a second linkage. The second linkage may have a length greater than that of the first linkage. The first and the second linkage may each be mounted for pivotal movement with respect to the chassis and the wheel connecting member. The mutual spacing in a direction transverse to the longitudinal axis of the chassis of the ends of the first and second linkages connected to the chassis may be greater than the spacing of the ends of the first and second linkages connected to the wheel connecting member in the direction of the common axis of rotation of the wheels, whereby pivotal movement of the first and second linkages causes the common axis of rotation of the wheels to rotate with respect to the longitudinal axis of the chassis.

In this way, the first and second linkage can control movement of the wheel connecting member from a position in which the common rotational axis of the wheels is transverse to the longitudinal axis of the chassis to a position in which the common rotational axis of the wheels is aligned with the longitudinal axis of the chassis. This allows the effective width of the vehicle to be reduced to the width of the chassis for insertion into a working area.

Viewed from a further aspect therefore the present invention provides a robotic vehicle, in particular for spraying insulation material, the vehicle comprising at least two driven wheels having a common axis of rotation, a chassis, having a longitudinal axis which is transverse to the common axis of rotation of the wheels in normal operation of the vehicle, and a wheel connecting member which connects the two wheels, wherein the wheel connecting member is connected to the chassis by a first linkage and a second linkage, the second linkage having a length greater than that of the first linkage, the first and the second linkage each being mounted for pivotal movement with respect to the chassis and the wheel connecting member, and wherein the mutual spacing in a direction transverse to the longitudinal axis of the chassis of the ends of the first and second linkages connected to the chassis is greater than the spacing of the ends of the first and second linkages connected to the wheel connecting member in the direction of the common axis of rotation of the wheels, whereby pivotal movement of the first and second linkages causes the common axis of rotation of the wheels to rotate with respect to the longitudinal axis of the chassis.

In embodiments of the invention, the first and second linkages are dimensioned to allow the common axis of rotation of the wheels to be rotated into a position where it is substantially parallel with the longitudinal axis of the chassis. This is not always necessary, as an effective width reduction may be achievable with the rotational axis at an acute angle to the longitudinal axis.

Pivotal movement of the first and second linkages may be achieved by means of motors, actuators, solenoids and the like. In a presently preferred embodiment, a Bowden cable is arranged to control movement of the first and second linkages. This arrangement is both simple, lightweight and, potentially, remotely actuable.

A remotely actuable latch may be provide to retain the wheel connecting member in a position with the common axis of rotation of the wheels substantially perpendicular to the longitudinal axis of the chassis. The latch may be actuated, for example, by a solenoid or the like.

In embodiments of the invention, each driven wheel comprises an electric motor mounted within the wheel. In this way, the wheels can be easily removable as there is no requirements for a mechanical drive connection to the wheels. In addition, each wheel can be individually driven to steer the vehicle.

The vehicle may comprise a spray gun mounted to the chassis. The spray gun may be provided with one or more hose connections for providing the material(s) to be sprayed. The spray gun may be mounted for rotation about one or more, for example at least two, axes relative to the chassis.

The robotic vehicle may comprise a camera, for example a video camera, mounted to the chassis. In embodiments of the invention, the camera may be a thermal camera. The camera may be mounted for rotation relative to the chassis, for example about one or more axes. Lights may be provided to illuminate the view of the camera. The lights may be arranged for rotational movement with the camera, for example mounted to a camera turret.

The robotic vehicle may comprise one or more laser rangefinders mounted for rotation with the camera. The provision of a laser rangefinder enhances the information available to an operator of the robotic vehicle.

Thus, viewed from a further aspect, the invention provides a robotic device comprising a chassis, a sensor turret mounted to the chassis for rotation relative thereto about a rotational axis, and a camera and a laser rangefinder mounted to the sensor turret for rotation therewith about the rotational axis. The laser rangefinder is configured to generate depth information by scanning in a plane substantially parallel to the rotational axis, and the relative position of the camera and the laser rangefinder on the turret is fixed, whereby to maintain a spatial correlation between the depth information from the laser rangefinder and image data generated by the camera.

In this way, the mechanical configuration of the sensor turret ensures the continued correlation of the depth information and the image data.

Typically, the rotational axis of the sensor turret is substantially perpendicular to a plane of the chassis, for example a substantially vertical axis.

The robotic device may further comprise at least one light for illuminating a field of view of the camera. The light(s) may be mounted to the chassis. In one embodiment, the light is mounted to the sensor turret for rotation therewith about the rotational axis. In this way, illumination of the field of view of the camera is ensured.

The camera may be a video camera. The camera may be a thermal camera. The robotic device may further comprise a tilt sensor. The robotic device may further comprise a further laser rangefinder configured to generate depth information by scanning in a plane substantially perpendicular to the rotational axis.

The robotic device may be battery powered. The robotic device may be a robotic vehicle, for example comprising at least two driven wheels or tracks. Alternatively, the robotic device may be provided, for example, on a motorised arm.

Thus, viewed from a further aspect, the invention provides a controller for a robotic device, the robotic device comprising a chassis, a spray gun for spraying material onto a surface, a camera, a laser rangefinder and a data communication module in data communication with the spray gun, the camera and the laser rangefinder. The controller is configured for data communication with the data communication module, whereby to receive data from the spray gun, the camera and the laser rangefinder, and to generate a representation on an operator display of a current spray pattern for the spray gun based on the received data.

The controller may be configured automatically to generate control data for the spray gun in response to input from an operator in combination with received data from the spray gun, the rangefinder and a tilt sensor mounted to the robotic device, in order to generate a spray pattern requested by the operator.

The invention extends to a general purpose computer, such as a laptop computer, programmed to operate as the controller and to computer software which programmes a general purpose computer to operate as the controller.

BRIEF DESCRIPTION OF THE DRAWINGS

Embodiments of the invention are further described hereinafter with reference to the accompanying drawings, in which.

DETAILED DESCRIPTION

As used herein, the term "robotic" refers to a device whose movements can be controlled remotely and/or by stored programming. The device may operate autonomously, semi-autonomously or entirely under operator control.

Figure 1:
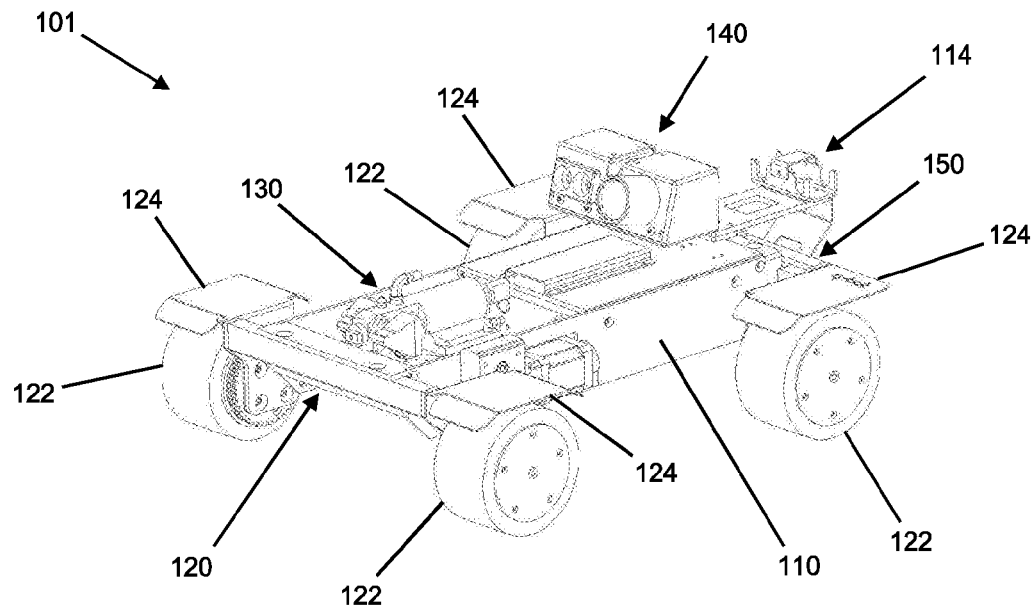
FIG. 1 is an illustration of an embodiment of a robotic vehicle according to the present disclosure.

FIG. 1 is an illustration of an embodiment of a robotic vehicle according to the present disclosure. A robotic vehicle 101 is used for moving along a lower surface of an underfloor cavity and applying an insulating layer to an underside of an upper surface of the underfloor cavity. The insulating layer is formed from polyurethane spray foam, e.g. BASF's Walltite, which is an expanding two part insulation material. However, it is also possible for the insulating layer to be formed of other sprayable materials, such as mineral wool with a chemical binder. The robotic vehicle 101 comprises a chassis 110 having a top and a bottom, and a front and a rear. The top of the chassis 110 is provided with a spray applicator in the form of a spray gun 130, and a sensor turret 140. The spray gun 130 is provided in front of the sensor turret 140. Both the spray gun 130 and the sensor turret 140 are arranged to rotate in order, respectively, to apply insulation to and acquire sensor data from a range of positions without additional translational movement of the robotic vehicle 101. The sensor turret 140 typically rotates about a single axis of rotation, substantially transverse to the lower surface on which the robotic vehicle 101 is configured to be moveable. The spray gun 130 is configured to rotate about two axes: an axis substantially transverse to the lower surface on which the robotic vehicle 101 is configured to be moveable and an axis substantially parallel to the lower surface on which the robotic vehicle 101 is configured to be moveable. In this way, the spray gun 130 and is rotatable side-to-side and up-and-down, whereby to apply insulation material to anywhere within a two dimensional region on the underside of the upper surface of the underfloor cavity without additional translational movement of the robotic vehicle 101.

The chassis 110 also comprises a propulsion system. A front wheel unit 120 is provided at the front of the chassis 110 and comprises two driven wheels 122 provided on respective sides of the front wheel unit 120. The front wheel unit 120 also comprises a wheel cover 124 over each of the driven wheels 122. A rear wheel unit 150 is provided at the rear of the chassis 110 and also comprises two driven wheels 122 provided on respective sides of the rear wheel unit 150. The rear wheel unit 150 also comprises a wheel cover 124 over each of the driven wheels 122. The driven wheels 122 provide propulsion which enables the robotic vehicle 101 to manoeuvre over the lower surface of the underfloor cavity. Each driven wheel 122 comprises a wheel and a motor unit connected to the wheel.

The chassis 110 is additionally provided with a hose mounting 114 configured to secure a length of hose (not shown) which is used to supply insulation material constituents to the spray gun 130 from a source container (not shown). The source container is typically positioned outside the underfloor cavity.

Figure 2:
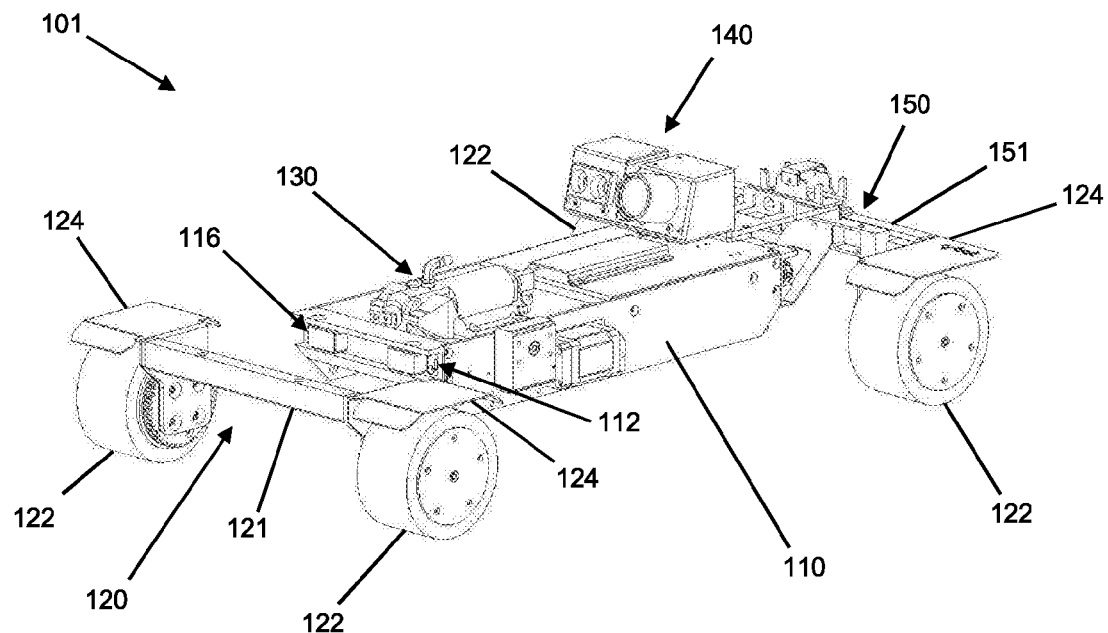
FIG. 2 is an illustration of the embodiment of the robotic vehicle shown in FIG. 1, with the front wheel unit and the rear wheel unit separated from the chassis of the robotic vehicle.
Figure 3:
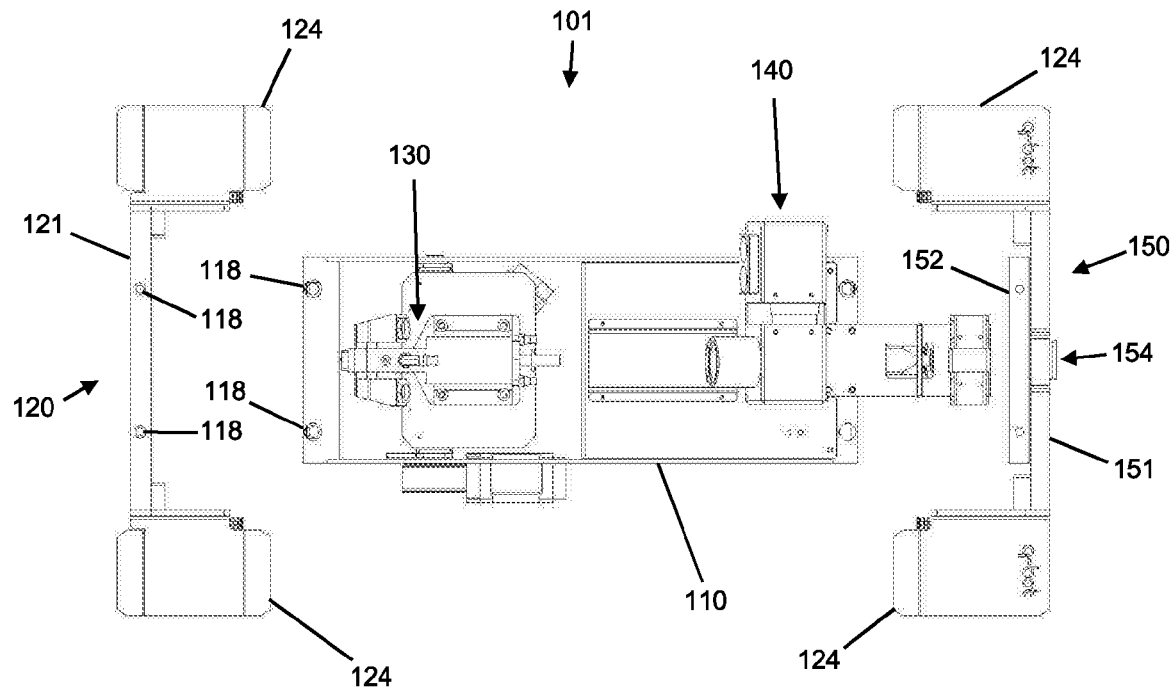
FIG. 3 is a further illustration of the embodiment shown in FIG. 2, viewed as a plan view of the robotic vehicle.
Figure 4:
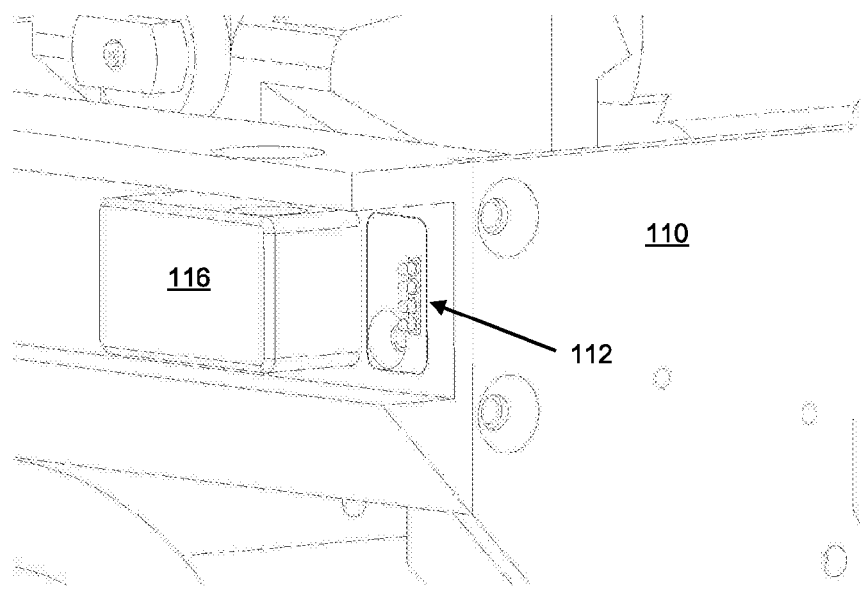
FIG. 4 is an illustration of a connecting mechanism used when connecting the front wheel unit to the chassis in the embodiment of the robotic vehicle shown in FIGS. 1 to 3.

FIG. 2 is an illustration of the embodiment of the robotic vehicle 101 shown in FIG. 1, with the front wheel unit 120 and the rear wheel unit 150 separated from the chassis 110 of the robotic vehicle 101. In some situations, access to the underfloor cavity is limited. In particular, only a small access port may be possible. The robotic vehicle 101 is configured to be inserted into an underfloor cavity through an access port smaller than the robotic vehicle 101 by temporary removal of the front wheel unit 120 and the rear wheel unit 150 from the robotic vehicle 101. The front wheel unit 120 comprises a wheel connecting member 121 connected to a driven wheel 122 at each end. The rear wheel unit 150 comprises a rear wheel connecting member 151, and a pair of driven wheels 122, as described in relation to FIG. 1 above. The front wheel unit 120 is configured to connect to the robotic vehicle 101, electrically, using connecting pins 112, which are typically push fit spring pin electrical connectors. The connecting pins 112 ensure the electronic components and driven wheels 122 are electrically connected to the chassis 110. As shown in FIG. 3, which is a further illustration of the embodiment shown in FIG. 2, viewed in plan, the front wheel unit 120 is secured to the chassis 110 using a block mounting 116. Once the front wheel unit 120 is positioned correctly, drop pins (not shown) are dropped through aligned holes 118 in the chassis 110 and front wheel unit 120 and screwed into position to secure the front wheel unit 120 to the chassis 110. The rear wheel unit 150 is secured to the chassis 110 in substantially the same way as the front wheel unit 120 is secured to the chassis. FIG. 4 is an illustration of a connecting mechanism used when connecting the front wheel unit 120 to the chassis 110 in the embodiment of the robotic vehicle shown in FIGS. 1 to 3.

Figure 5:
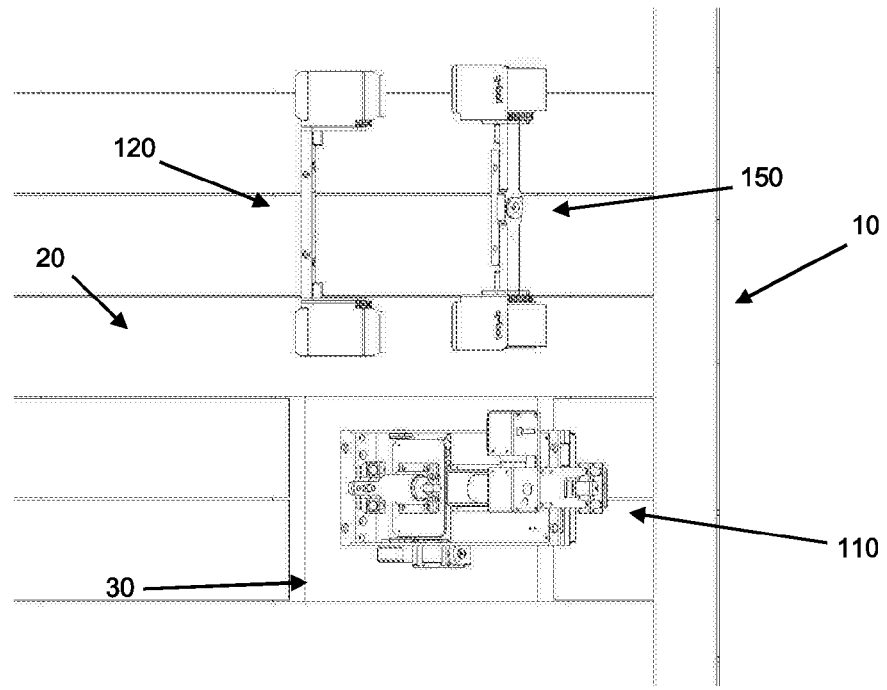
FIG. 5 is an illustration of an insertion method useable with the embodiment of the robotic vehicle shown in FIGS. 1 to 4.
Figure 6:
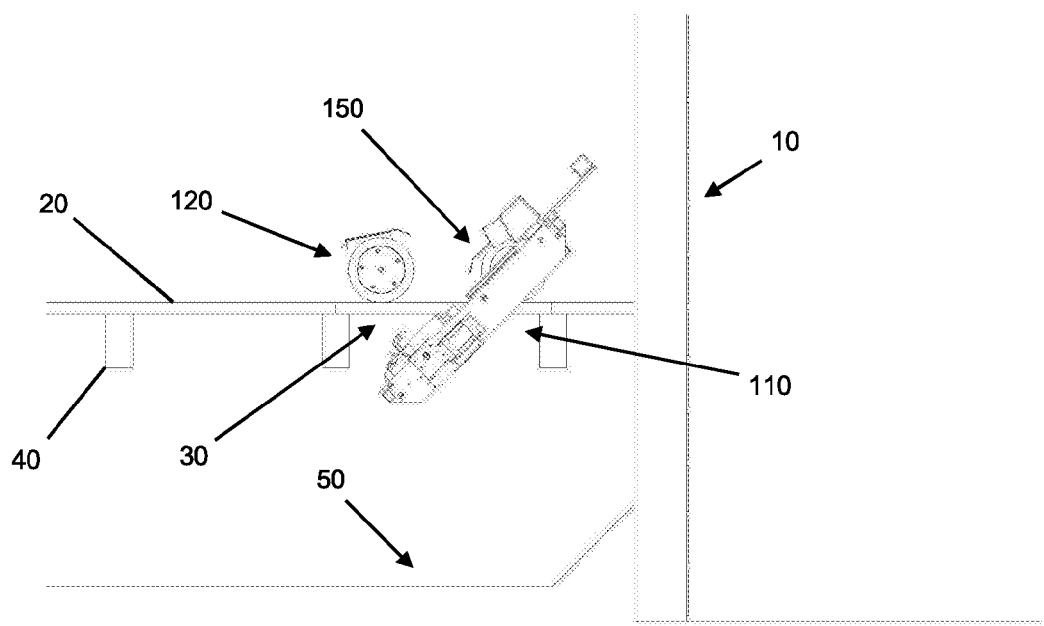
FIG. 6 is a further illustration of the insertion method shown in FIG. 5.

FIG. 5 is an illustration of an insertion method useable with the embodiment of the robotic vehicle shown in FIGS. 1 to 4. A wooden floor is formed from floorboards 20 which run up to a wall 10. In FIG. 5, two floorboards 20 have been cut to make an opening 30 into the underfloor void which is approximately 400×350 mm. By removing the front wheel unit 120 and the rear wheel unit 150, the robotic vehicle 101 can more easily be inserted through the opening 30 and lowered to a lower surface 50 of the underfloor void one piece at a time and then reassembled. Typically, the reassembly is done by hand, which is facilitated by the simple connection of the front wheel unit 120 and the rear wheel unit 150 to the chassis 110 using the drop pins. FIG. 6 is a further illustration of the insertion method shown in FIG. 5.

Figure 7:
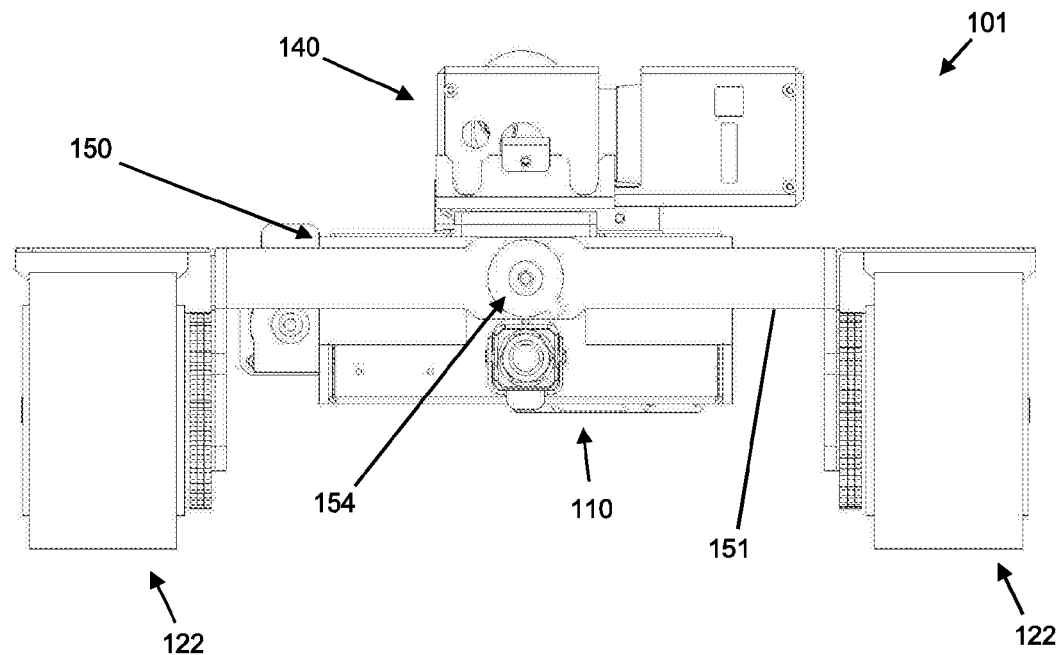
FIG. 7 is an illustration of a rear of the robotic vehicle shown in FIG. 1.
Figure 8:
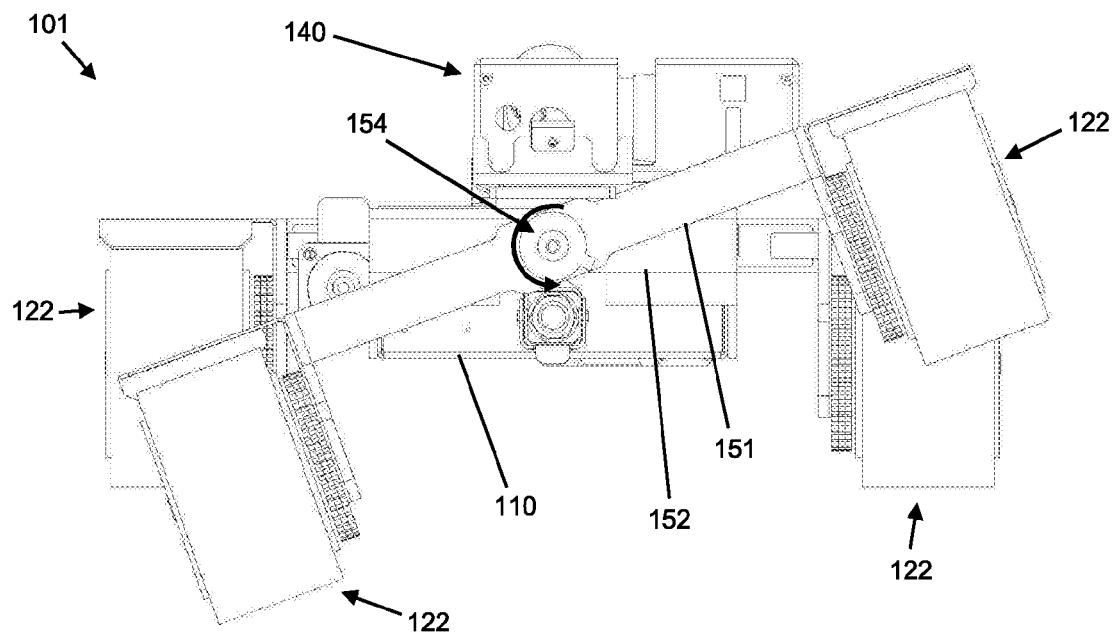
FIG. 8 is an illustration of a rear of the robotic vehicle shown in FIG. 1, showing the operation of the traction mechanism.

FIG. 7 is an illustration of a rear of the robotic vehicle 101 shown in FIG. 1. FIG. 8 is a further illustration of the rear of the robotic vehicle shown in FIG. 1, showing the operation of a suspension mechanism. The robotic vehicle 101 comprises the chassis 110, being provided with the sensor turret 140, and connected to the rear wheel unit 150. The rear wheel unit 150 comprises a rear wheel connecting member 151 connected to the two driven wheels 122 as described previously. The rear wheel unit 150 also comprises a mounting member 152 connected to the rear wheel connecting member 151 between the rear wheel connecting member 151 and the chassis 110. The mounting member 152 is connected to the rear wheel connecting member 151 through a pivot point 154 allowing free rotation of the rear wheel connecting member relative to the chassis 110 about an axis perpendicular to the direction of spacing of the rear wheels 122. The single pivot design allows for the driven wheels 122 on the robotic vehicle 101 to overcome large obstacles. The single pivot design allows for the wheels of the robotic vehicle 101 to remain in contact with ground and provide traction against the ground whilst lifting the chassis 110 of the robotic vehicle 101 over the obstacle.

Figure 9:
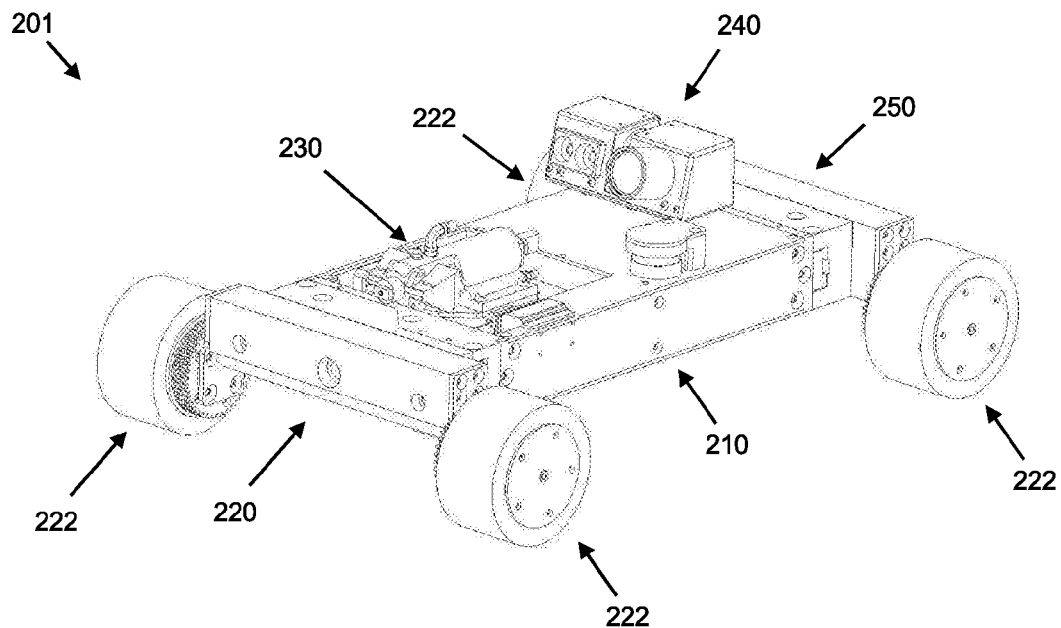
FIG. 9 is an illustration of a further embodiment of a robotic vehicle according to the present disclosure.

FIG. 9 is an illustration of a further embodiment of a robotic vehicle 201 according to the present disclosure. The features of the robotic vehicle 201 are substantially as described with reference to robotic vehicle 101 and FIGS. 1 to 8 above, apart from the hereinafter described differences. Like reference numerals represent similar features. For example, robotic vehicle 201 comprises a chassis 210, being provided with a sensor turret 240 and a spray gun 230. The chassis 210 is connected to a front wheel unit 220 and a rear wheel unit 250, each being provided with two driven wheels 222.

Figure 10:
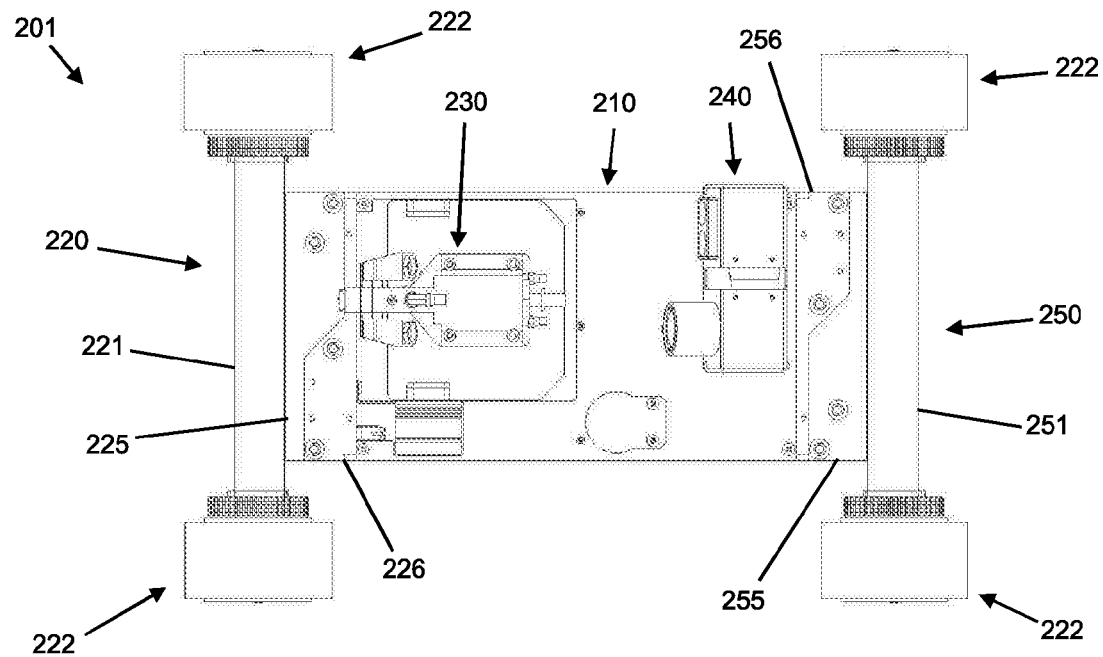
FIG. 10 is a further illustration of the embodiment shown in FIG. 9, viewed as a plan view of the robotic vehicle.

FIG. 10 is a further illustration of the embodiment shown in FIG. 9, viewed in plan. The front wheel unit 220 comprises a front wheel connecting member 221, a chassis mounting member 226 connected to the chassis 210, and a wheel mounting member 225 provided between the front wheel connecting member 221 and the chassis mounting member 226. Similarly, the rear wheel unit 250 comprises a rear wheel connecting member 251, a chassis mounting member 256 connected to the chassis 210, and a wheel mounting member 255 provided between the rear wheel connecting member 251 and the chassis mounting member 256.

Figure 11:
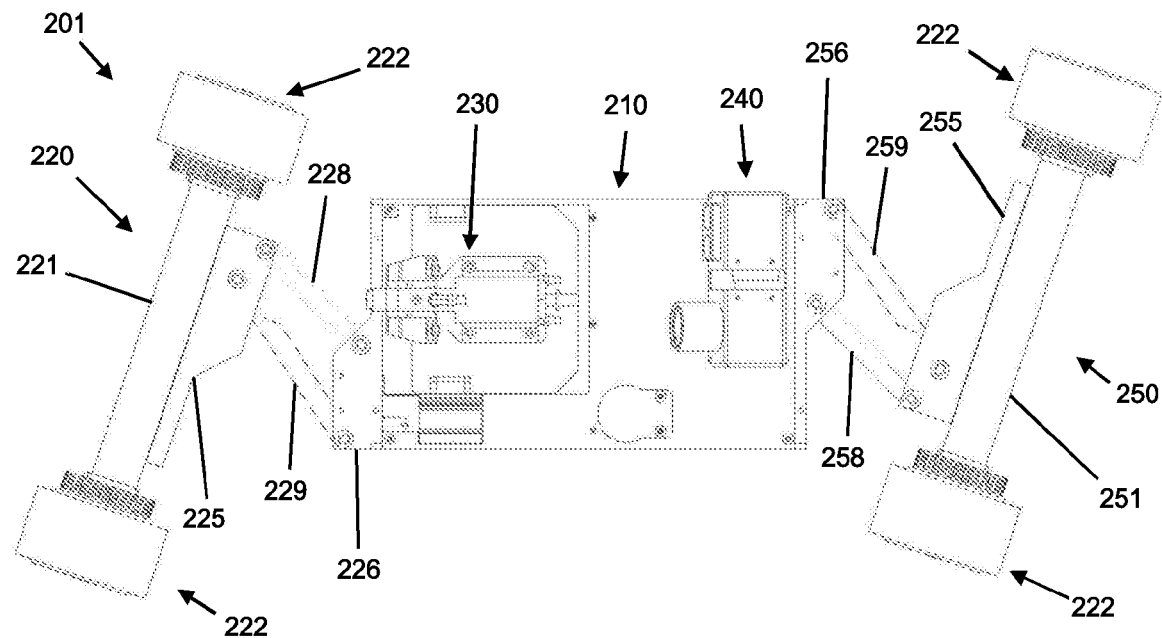
FIG. 11 is an illustration of the embodiment shown in FIGS. 9 and 10, showing the folding wheel unit in a partially unfolded configuration.
Figure 12:
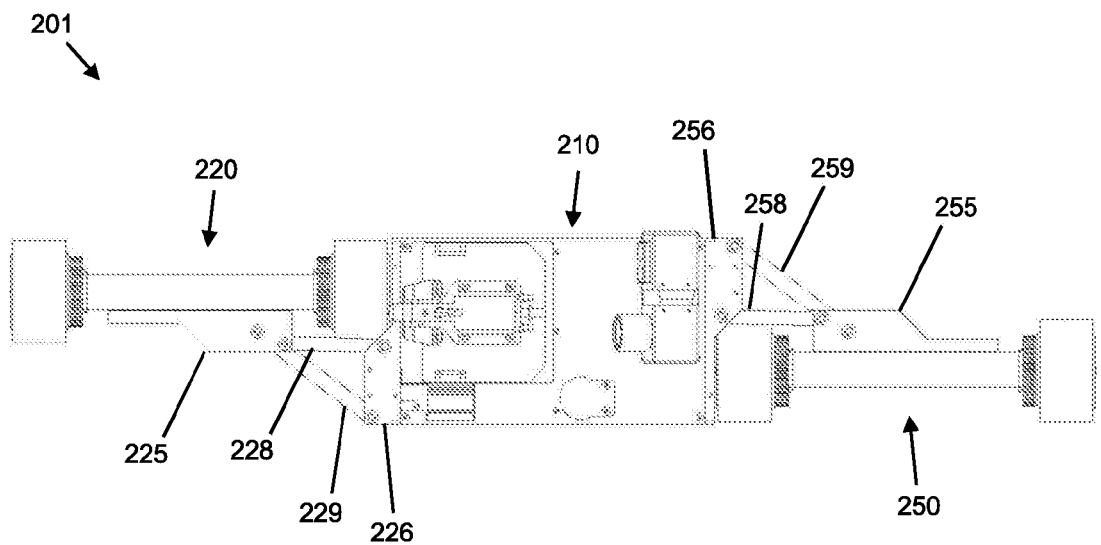
FIG. 12 is an illustration of the embodiment shown in FIGS. 9 to 11, showing the folding wheel unit in a fully unfolded configuration.

FIG. 11 is an illustration of the embodiment shown in FIGS. 9 and 10, showing the front wheel unit 220 and the rear wheel unit 250 each in a partially unfolded configuration. The front wheel unit 220 further comprises a primary linkage 228 and a secondary linkage 229, each connecting the wheel mounting member 225 to the chassis mounting member 226. The primary linkage 228 is shorter than the secondary linkage 229 but is of sufficient length to accommodate one wheel 222 between the chassis 210 and the wheel mounting member 225 when the front wheel unit 220 is in the fully unfolded position shown in FIG. 12. The primary linkage 228 and the secondary linkage 229 are mounted to the chassis mounting member 226 at respective pivoting mounting points with a spacing in the side-to-side direction of the robotic vehicle 201 that is greater than the spacing of the corresponding pivoting mounting points on the wheel mounting member 225. The pivoting mounting point of the secondary linkage 229 on the chassis mounting member 226 is positioned outwardly of the pivoting mounting point of the primary linkage 228 on the chassis mounting member 226. In this way, in moving from the folded position shown in FIG. 10 to the fully unfolded position of the shown in FIG. 12, the relative positioning of the primary linkage 228 and the secondary linkage 229 on the wheel mounting member 225 and the chassis mounting member 226 causes the wheel connecting member 221 to rotate through substantially 90 degrees. The respective pivoting mounting points of the primary linkage 228 and the secondary linkage 229 on the wheel mounting member 225 and the chassis mounting member 226 are spaced in the front-to-back direction of the robotic vehicle 201 so that the primary linkage 228 and the secondary linkage 229 fit side by side in the folded position shown in FIG. 10. The wheel mounting member 225 and the chassis mounting member 226 are also shaped to fit together in the folded position shown in FIG. 10.

Similarly, the rear wheel unit 250 comprises a primary linkage 258 and a secondary linkage 259, each connecting a wheel mounting member 255 to a chassis mounting member 256, which operate in the same manner as the corresponding components of the front wheel unit 220.

Figure 13:
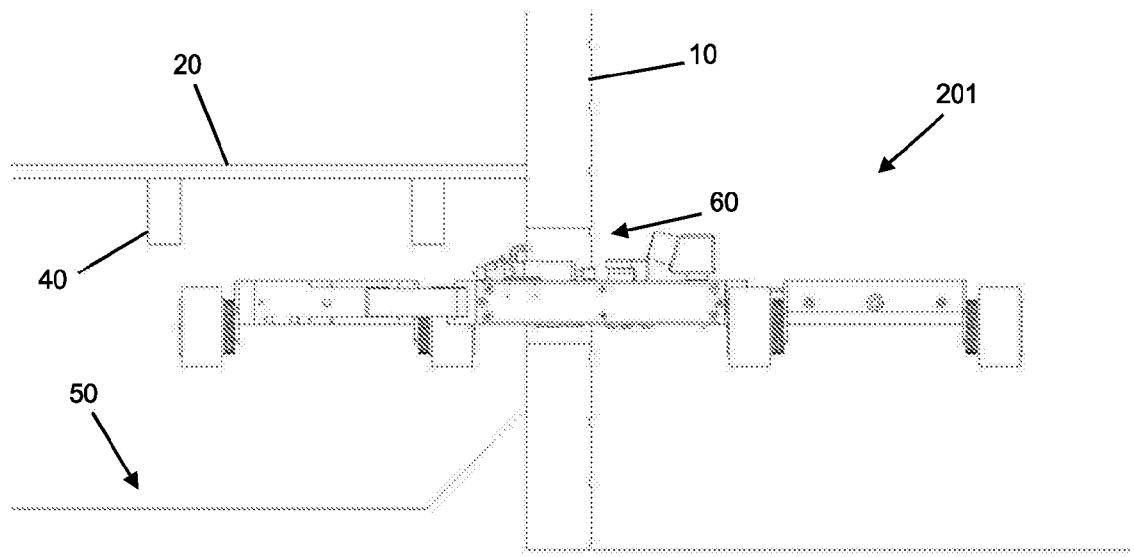
FIG. 13 is an illustration of an insertion method useable with the embodiment of the robotic vehicle shown in FIGS. 9 to 12.

FIG. 13 is an illustration of an insertion method useable with the embodiment of the robotic vehicle 201 shown in FIGS. 9 to 12. The robotic vehicle 201 can fold and unfold itself allowing it to enter a small opening 60 provided in a wall 10. The folding mechanism allows the front wheel connecting member 221 and the rear wheel connecting member 251 to each rotate 90°, and move away from the chassis 110 at the same time. This allows for a wide and stable wheel unit 220, 250 to be used whilst the robotic vehicle 201 is also able to fit through a small opening 60 to access an underfloor cavity. The small opening 60 may be made by removing an air vent, brick or by drilling a hole.

Figure 14:
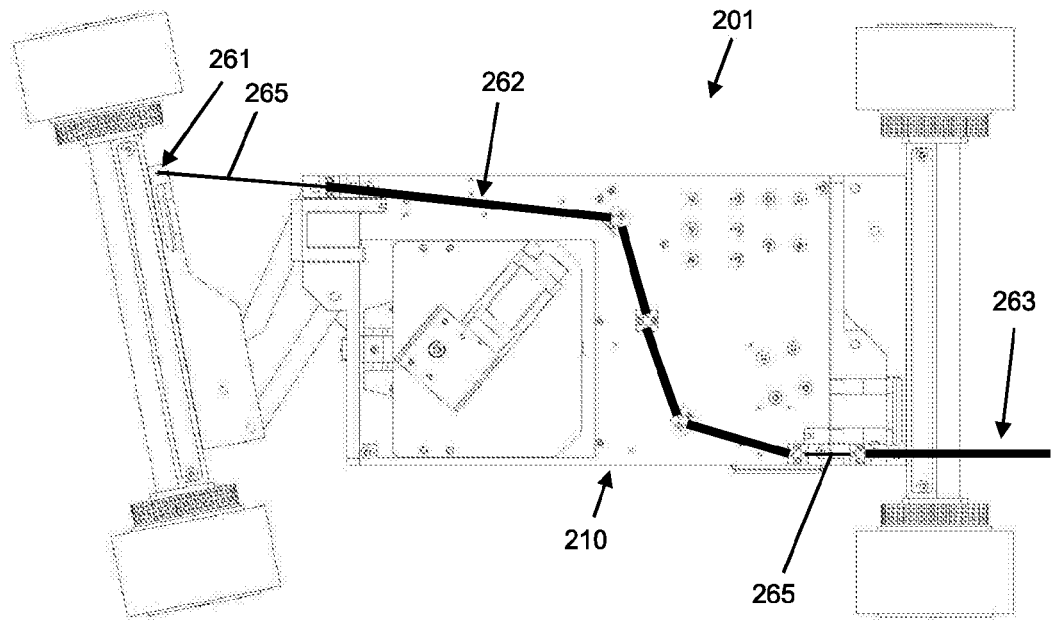
FIG. 14 is an illustration of the underside of the robotic vehicle of FIGS. 9 to 12, showing a mechanism for folding in the folding front wheel unit mechanism.

FIG. 14 is an illustration of the underside of the robotic vehicle 201 of FIGS. 9 to 12, showing a mechanism for closing the front wheel unit 220. A cable 265 is connected to a mounting point 261 on the wheel mounting member 225. The cable 265 passes through a cable housing in the form of a first sheath 262 on the underside of the chasses 110. The first sheath 262 allows the cable 265 to pass, but does not allow the cable to compress, in the manner of a Bowden cable. The cable 265 also passes through a second sheath 263 extending beyond the robotic vehicle 201 to a motor or operator of the robotic vehicle 201 to close the front wheel unit 220 remotely. Although FIG. 14 only shows a closing mechanism for the front wheel unit 220, it will be appreciated that a similar mechanism may be provided for the rear wheel unit 250. The mechanism can be opened by pulling the robotic vehicle 201 by an umbilical cord connecting the robotic vehicle 201 to the operator (not shown) or by driving some of the driven wheels 222.

Figure 15:
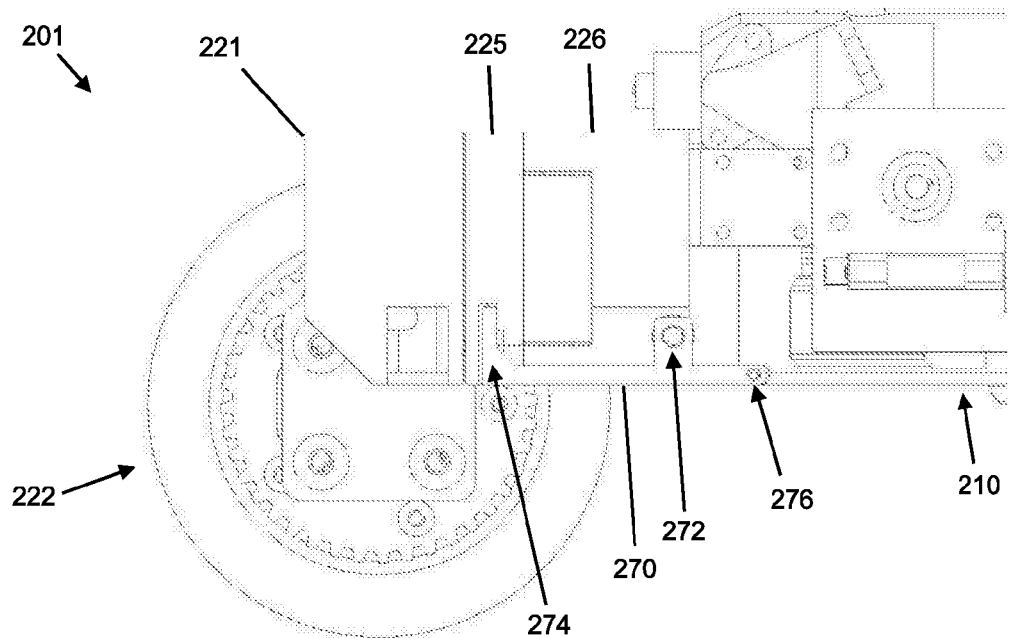
FIG. 15 is an illustration of a latch useable for releasing the folding front wheel unit mechanism of the robotic vehicle of FIGS. 9 to 14.

FIG. 15 is an illustration of a latch 270 useable for releasing the front wheel unit 220 of the robotic vehicle 201 of FIGS. 9 to 14. The front wheel unit 220 is held in place when the robotic vehicle 201 is in use by a latch 270. The latch 270 comprises a hook portion 274 configured to engage with a portion of the wheel mounting member 225, and is rotatable around a pivot point 272 provided on the chassis mounting member 226. The latch 270 is further provided with an operating hole 276 provided opposite the pivot point 272 from the hook portion 274, and which can be used to unfasten the hook portion 274 from the wheel mounting member 225. The latch 270 is operated by pulling up on the operating hole 276 and may be actuated by a cable, solenoid, motor or the like.

Figure 16:
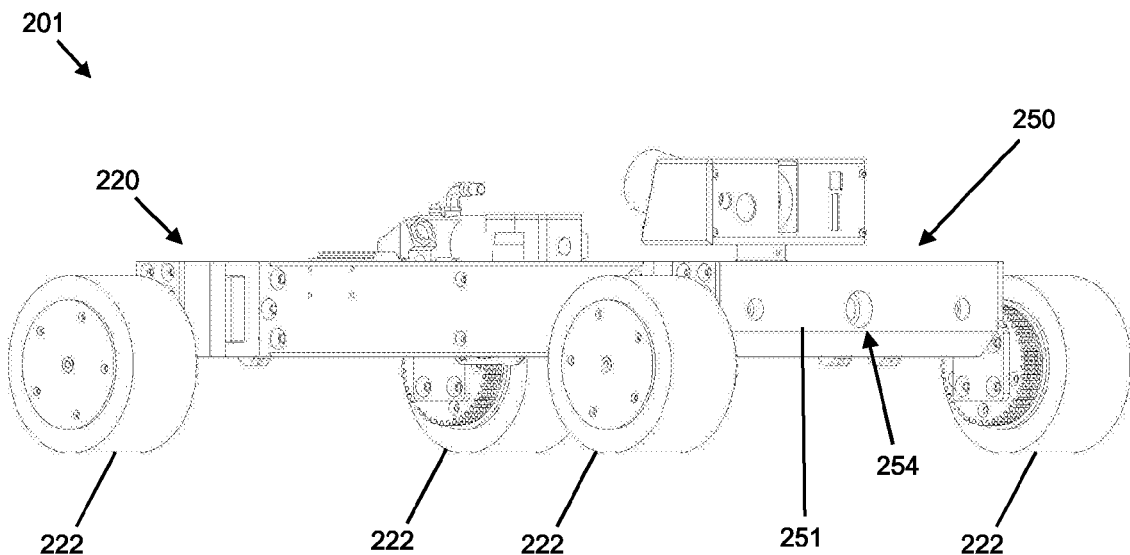
FIG. 16 is an illustration of the robotic vehicle of FIGS. 9 to 15, showing the rear traction mechanism.
Figure 17:
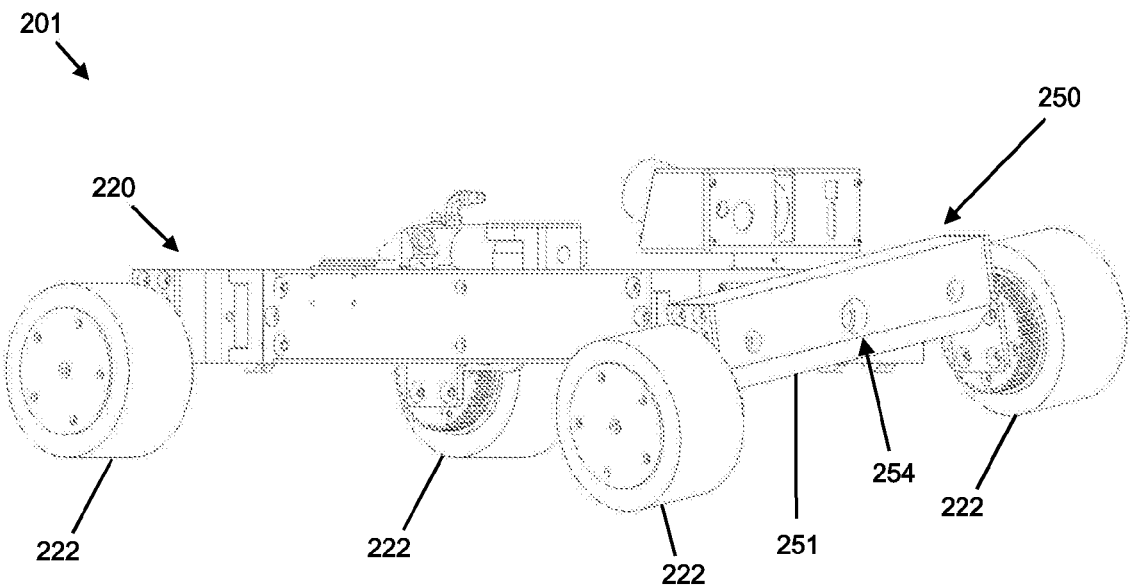
FIG. 17 is a further illustration of the rear traction mechanism of FIG. 16, showing the rear traction mechanism in a rotated position.
Figure 18:
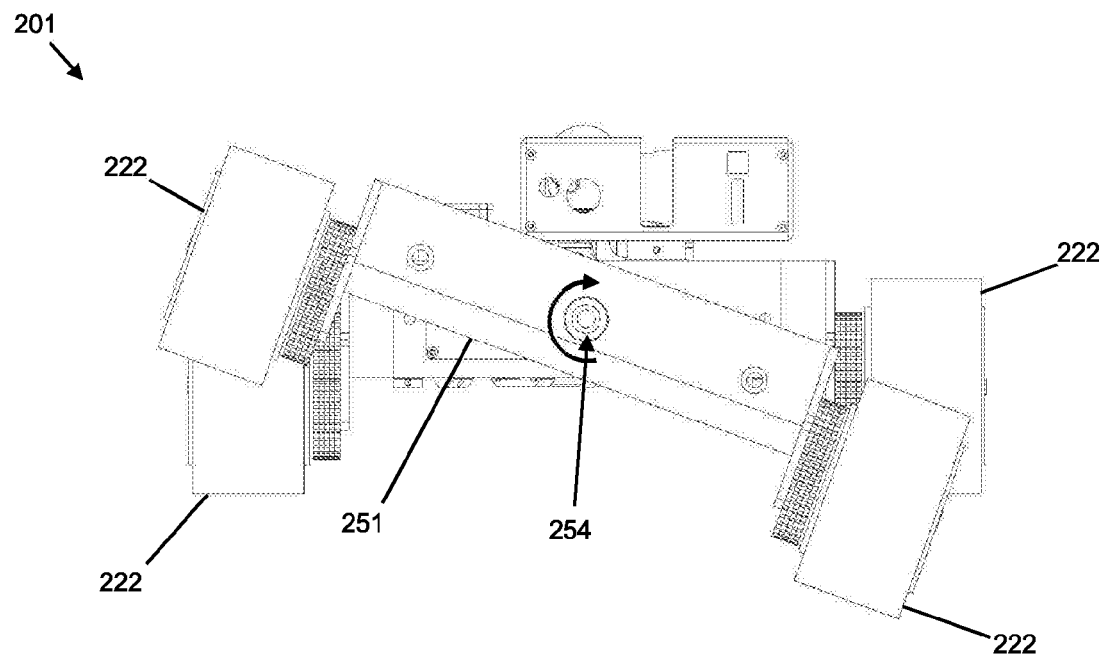
FIG. 18 is a yet further illustration of the rear traction mechanism as shown in FIG. 17, showing the rear of the robotic vehicle.

FIGS. 16 to 18 are illustrations of the robotic vehicle 201 of FIGS. 9 to 15, showing the rear suspension mechanism used to ensure all wheels remain in contact with the surface on which the robotic vehicle 201 is operating. The suspension mechanism comprises a rear wheel connecting member 251, moveable about a pivot point 254, and is substantially as described with reference to the wheel connecting member 151 and pivot point 154 of the robotic vehicle 101 shown in FIGS. 1 to 8.

Figure 19:
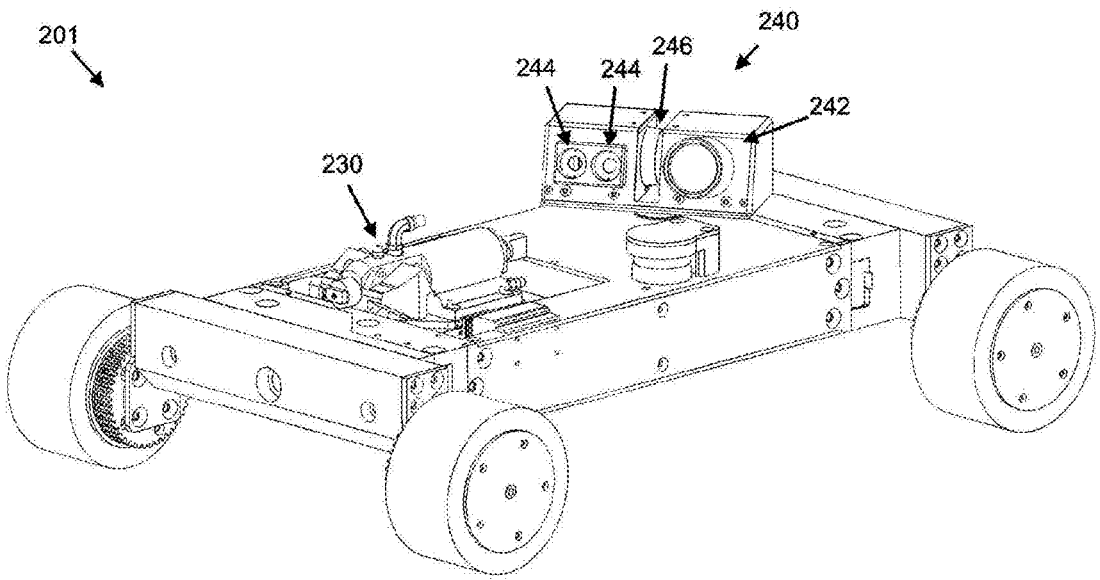
FIG. 19 is an illustration of the robotic vehicle of FIGS. 9 to 18, showing the sensor turret.

FIG. 19 is an illustration of the robotic vehicle of FIGS. 9 to 18, showing a sensor module in the form of a sensor turret 240. The sensor turret 240 comprises a camera 242, a pair of lights 244, and a vertical plane laser scanner 246. The sensor turret 240 is configured to be rotatable, and the camera 242, the lights 244 and the vertical plane laser scanner 246 are each arranged to point in an aligned horizontal direction. In this way, the lights 244 can be used to illuminate the scene captured by the camera 242, whilst minimising the shadows present in the image captured by the camera 242. The vertical plane laser scanner 246 is used to determine a distance to a sampling of points on the vertical plane in the direction of the horizontal rotational position of the sensor turret 240. The sensor turret 240 allows the robotic vehicle to produce a three-dimensional point cloud map, with camera images over laid to produce a texture map. The sensor turret can rotate 360° which allows the robotic vehicle 201 to generate a full hemispherical texture map of the area that has been scanned.

Figure 20:
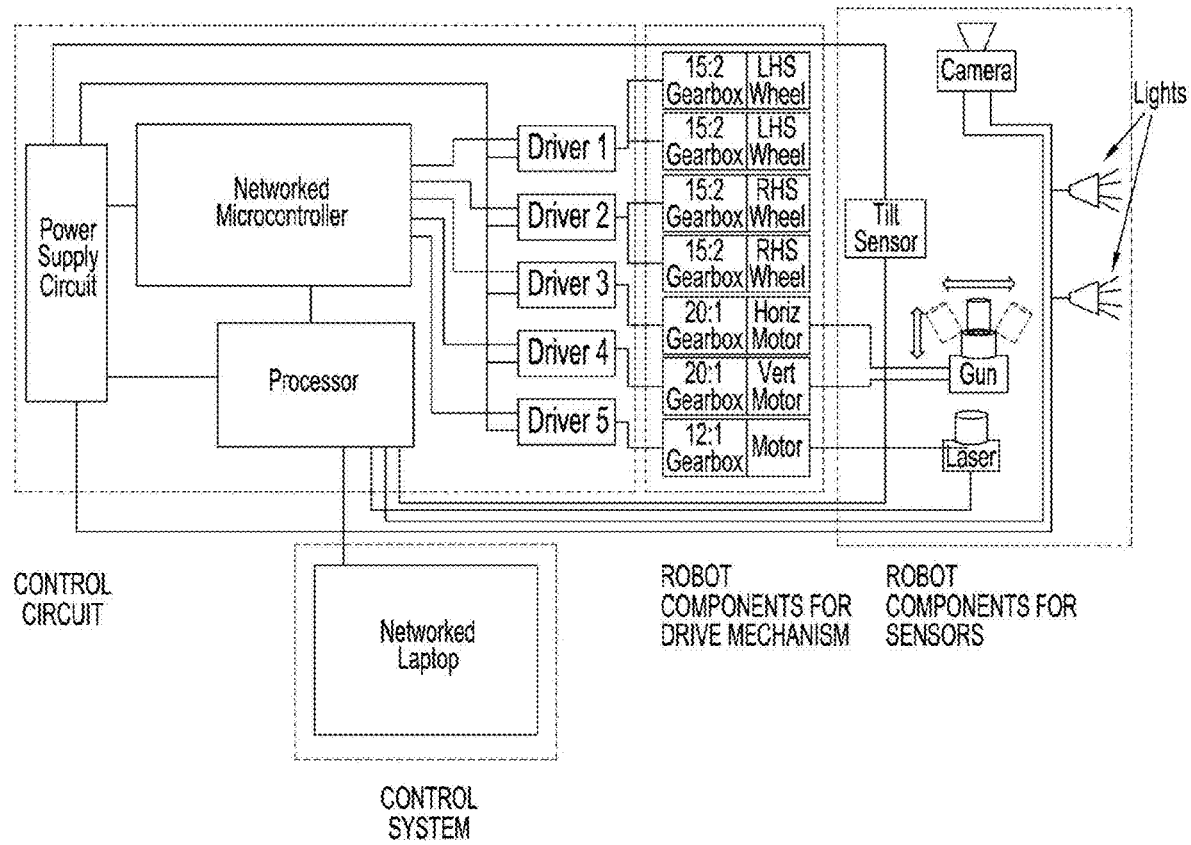
FIG. 20 is a representation of a control system for an embodiment of a robotic vehicle according to the present disclosure.

FIG. 20 is a representation of a control system for an embodiment of a robotic vehicle according to the present disclosure. The robotic vehicle components, control system software and the control circuit are connected together in an integrated way.

In operation, the robotic vehicle takes information from a tilt sensor to understand its orientation relative to a flat ground plane, and the 3D scan from the laser sensor to calculate its position relative to the surface to be treated. The system can then calculate where the spray gun is pointing relative to the image from the camera and overlay that information on a video feed. This provides the operator with more intuitive controls and understanding of where the spray gun is pointing than is possible with the limited depth perception available through a single camera. The operator can also point or otherwise select a region on a screen of an operator terminal and select the area that the robotic vehicle is to spray. The processor of the robotic vehicle then calculates the movements required to spray that area.

It will be appreciated that it would also be possible for the operator to use an alternative input device, such as a 3D headset like Oculus Rift.

As shown in FIG. 20, a DC power supply circuit provides power to a networked microcontroller, a processor, each of the drivers for the respective motors, the tilt sensor, the camera and the lights. The networked microcontroller provides low voltage control signals to each of the drivers for the respective motors. The processor is in data communication with each of the tilt sensor, the laser and the camera. A driver is provided for the left front and rear wheel motors and supplies control power signals to the wheel motors. Similarly, a driver is provided for the right front and rear wheel motors. The wheel motors drive the wheels via a 15:2 ratio gearbox, which is incorporated into the wheels. A respective driver is provided for the horizontal and vertical rotational motors of the spray gun and supplies control power signals to the respective spray gun motors. The spray gun motors drive the spray gun via a 20:1 ratio gearbox. A driver is provided for the motor of the laser and supplies control power signals to the laser motor. The laser motor drives the laser via a 12:1 ratio gearbox. The processor is connected via a computer network connection to an external networked laptop which provides control information to and from the operator.

Figure 21:
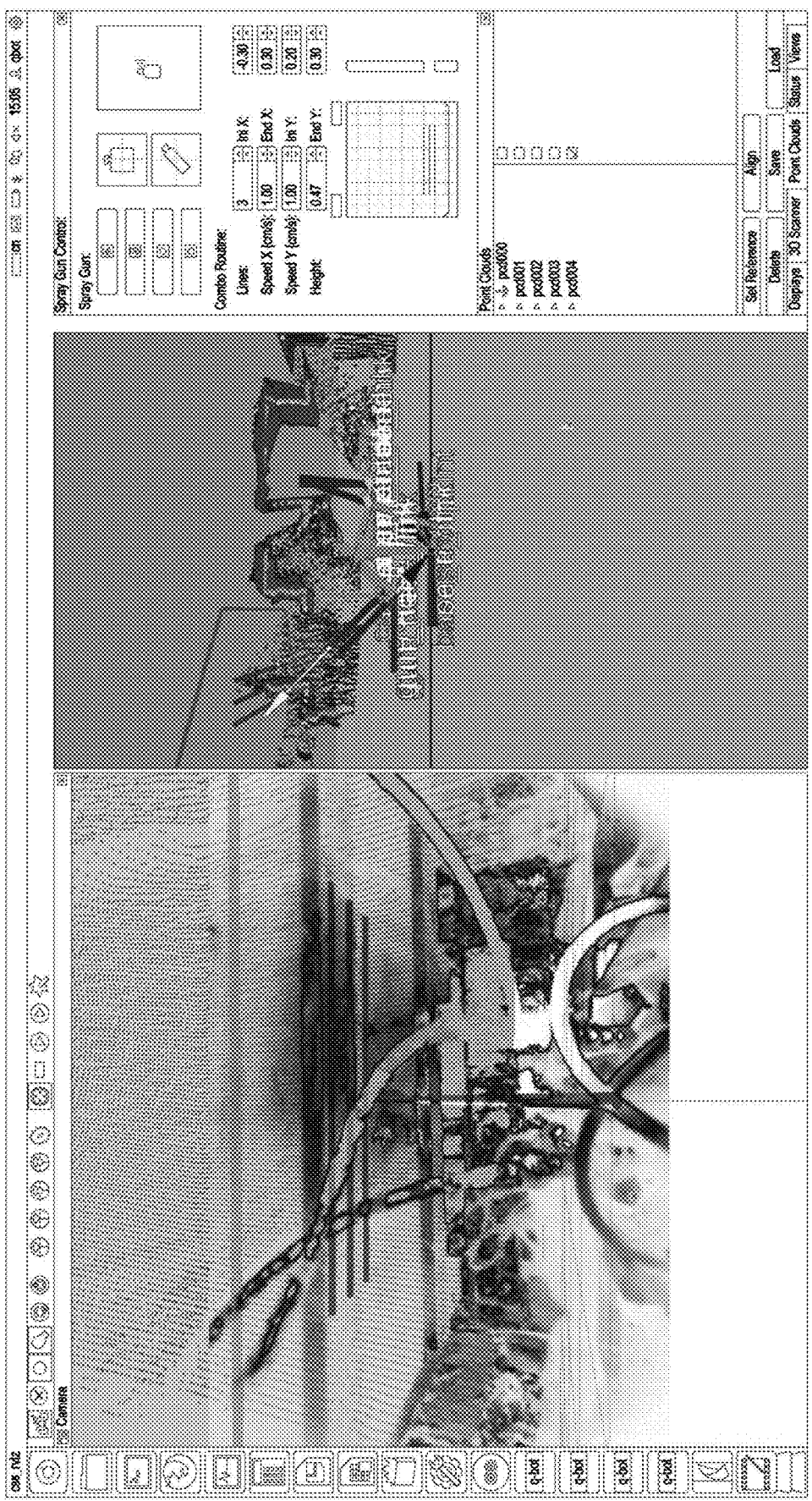
FIGS. 21 to 23 are illustrations of an embodiment of a user interface used by operators of a robotic vehicle as described in the present disclosure, showing the interface for controlling a spray gun mounted on the robotic vehicle.
Figure 22:
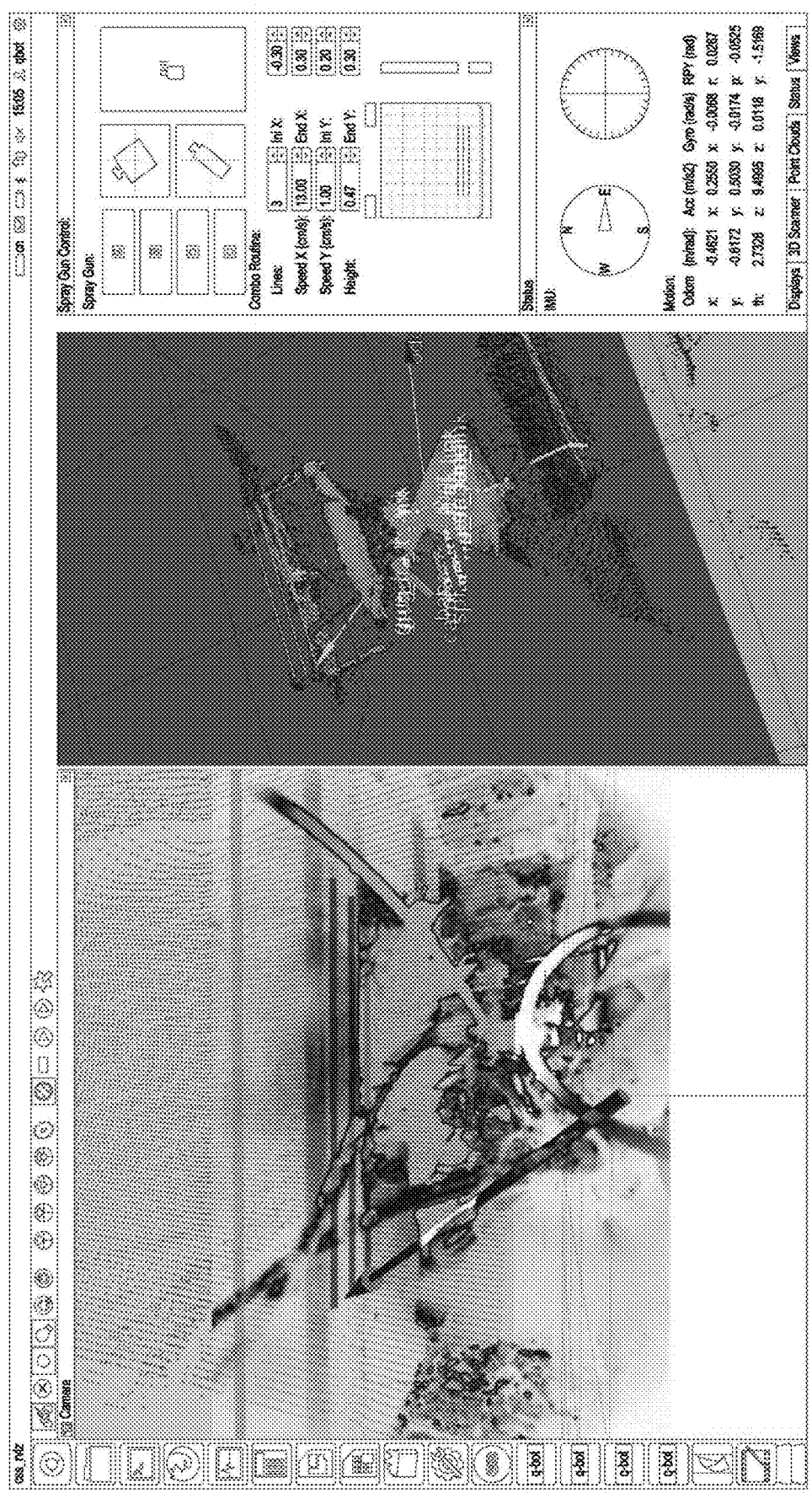
Figure 23:
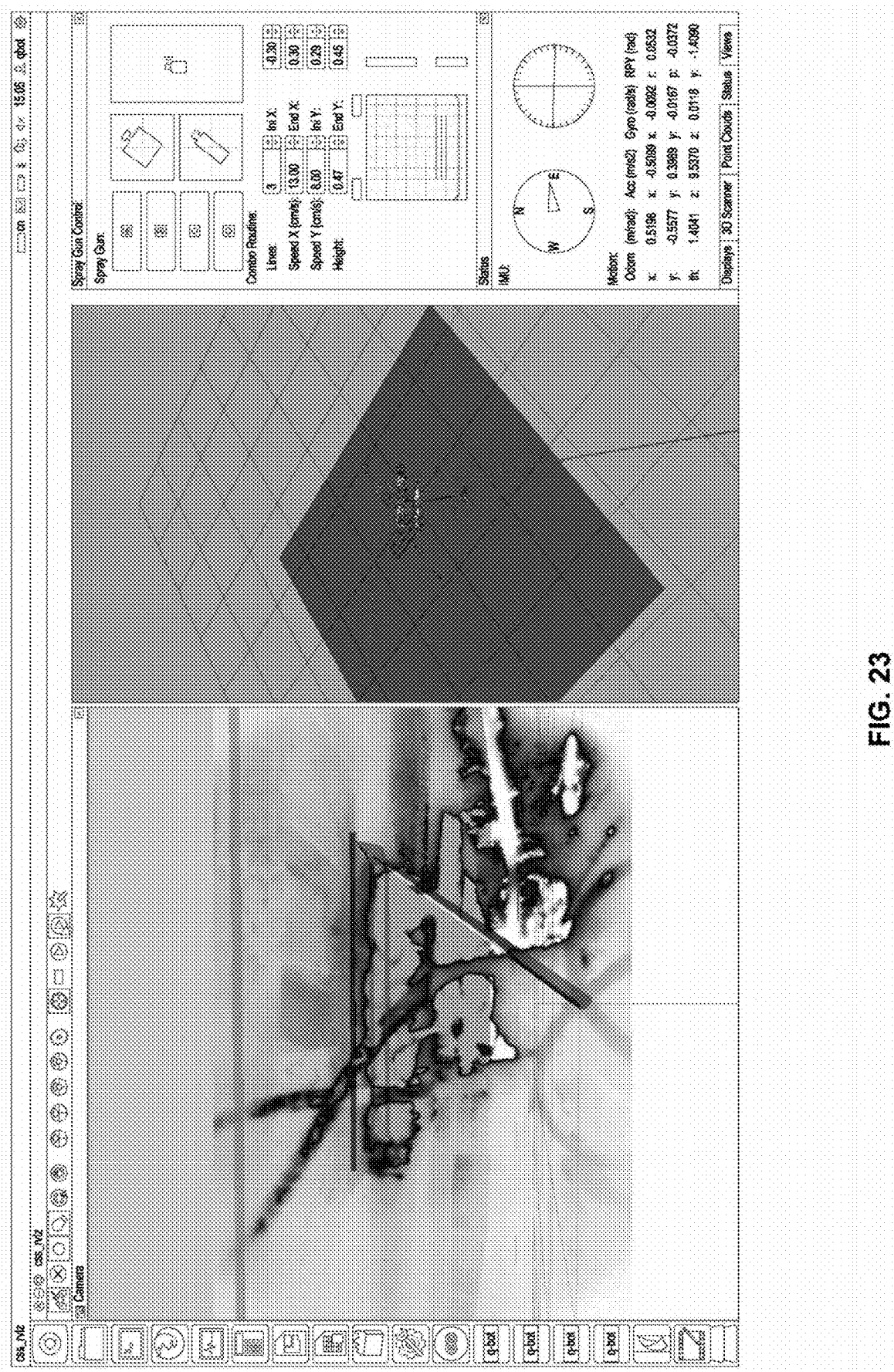

FIGS. 21 to 23 are illustrations of an embodiment of a user interface used by operators of a robotic vehicle as described in the present disclosure, showing the interface for controlling a spray gun mounted on the robotic vehicle.

FIG. 21 shows the video feed from the onboard camera with information from the map and scanning overlaid. The operator is shown where the gun is pointing by an arrow and can directly control the movement, for example with a gamepad controller. The operator can also select the area to spray and the robotic vehicle calculates the movement required to spray that area. In this case the strokes are shown as horizontal lines overlaid on the camera feed on the area to be sprayed. As shown in FIGS. 21 to 23, alongside the processed view from the camera, the user can select different views of the overall positioning of the robotic vehicle and the orientation of the spray gun within the space to be treated.

Figure 24:
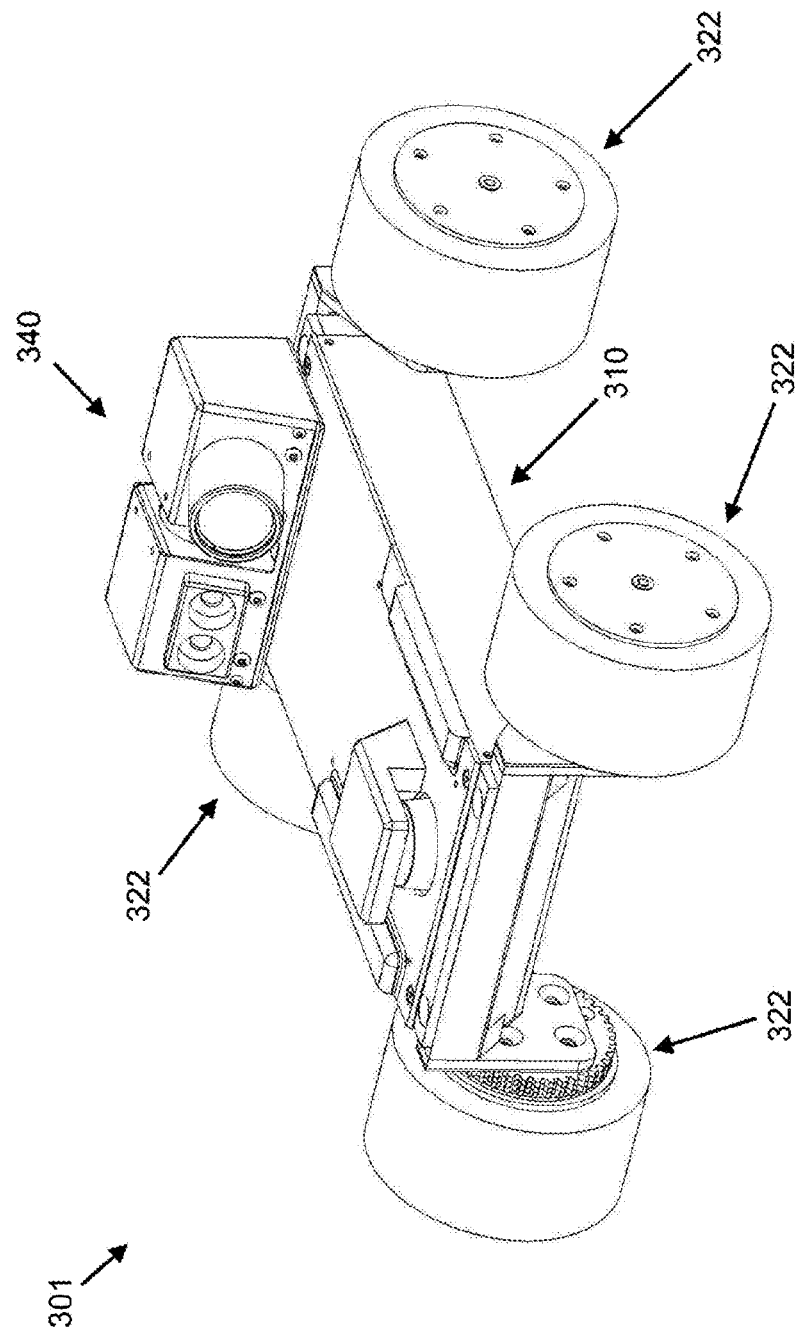
FIG. 24 is an illustration of an embodiment of a robotic vehicle according to the present disclosure.

FIG. 24 is an illustration of an embodiment of a robotic vehicle 301 according to the present disclosure. The robotic vehicle 301 comprises the removable wheel units as seen in robotic vehicle 101 shown in FIGS. 1 to 8. The robotic vehicle 301 also comprises a small chassis 310, a sensor turret 340, substantially as described with reference to the sensor turret 240 of FIGS. 9 to 19 and a second laser to locate the robotic vehicle 301 in the horizontal plane. The robotic vehicle 301 also includes batteries (not shown) so it can operate wirelessly without requiring power via an umbilical connection. The robotic vehicle 301 is configured to operate as a surveying robotic vehicle to gather information and sensor data regarding a cavity before a treatment robotic vehicle will be sent into the cavity.

Figure 25:
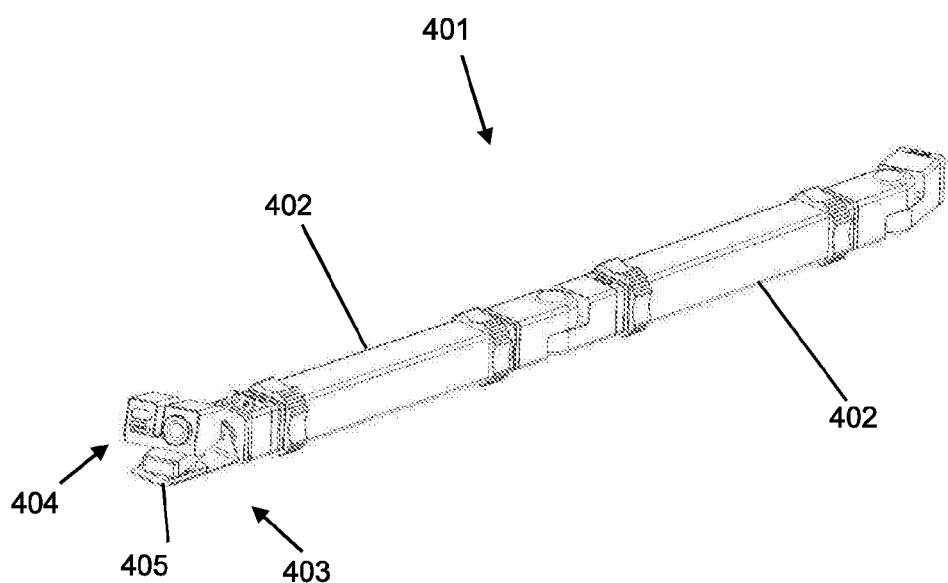
FIG. 25 is an illustration of an embodiment of a robotic device according to the present disclosure.

FIG. 25 is an illustration of an embodiment of a robotic device 401 according to the present disclosure. The robotic device 401 is in the form of a motorised arm formed of a plurality of interengagable modular units 402. At one end, the robotic device 401 comprises a modular unit 403 formed of a chassis 405 and a sensor turret 404, substantially as described with reference to the sensor turret 240 of FIGS. 9 to 19. The robotic device 401 is configured to operate as a surveying robotic device to gather information and sensor data regarding a cavity before a treatment robotic device will be sent into the cavity.

In summary, a robotic vehicle, in particular for spraying insulation material, comprises a chassis 110, at least two driven wheels 122 having a common axis of rotation, and a wheel connecting member 151 which connects the two wheels 122. The wheel connecting member 151 is connected to the chassis by a pivotal connection which allows the wheel connecting member to pivot with respect to the chassis about a pivoting axis transverse to the common axis of rotation of the wheels. The wheel connecting member 151 may be removably mounted to the chassis 110.

Embodiments of the invention include folding axles in which the folding mechanism pulls the axle in line with the chassis. The mechanism can be actuated remotely either by driving the wheels or through a pull cable. Alternatively the mechanism can be motorised or actuated but this requires additional components which add size, bulk and complexity so using the existing motors and/or a cable system that can be operated by a person outside the void is preferable. This allows the folding mechanism to be deployed remotely. A locking catch is also included to ensure the axles are firmly held in place.

Embodiments of the invention include removable axles. When inserting through a floor or ceiling opening it is easier and quicker to remove the axles, drop the chassis in and then reconnect the axles in the void, as the operator can simply reach in and connect everything. This also makes the robotic vehicle easier to transport. The removable axles may also be foldable. In some embodiments, one of the axles of the robot may be removable, whereas another axle of the robotic vehicle may be a folding axle. In particular, the front axle of the robotic vehicle may be a folding axle and the rear axle of the robotic vehicle may be a removable axle. The front of the robotic vehicle is usually in the default direction in which the gun points.

Embodiments of the invention provide a simple, compact and robust suspension arrangement to ensure all wheels remain in contact with uneven ground and traction is maintained. One axle is fixed relative to the chassis and the second axel is able to pivot on a single axis relative to the chassis and the first axle. This allows all wheels to remain in contact with the ground, but no additional suspension arrangement is needed. For example if both the axles were free to move then additional shocks, springs, dampers, etc may be desirable to keep the chassis level, which creates complexity and takes up space.

The robotic vehicle may be combined in different ways to suit the application and terrain. This includes swapping the folding or removable axles quickly on each chassis to suit the given application. This has the benefit that the operator can use the same chassis without needing to remove or reconnect the spray equipment, etc and quickly suit the site. Both axles may be used at the same site to suit different access methods. Similarly different sensor modules may be used. Drive wheels can also be easily swapped, should one fail, for example. The robotic vehicle may be used to either apply different materials and/or survey. In one version of the robotic vehicle the spray equipment is replaced by batteries to create a remotely operable survey robotic vehicle. The umbilical cord that provides power and communication also has a quick fit, locking mechanism.

The camera may be visual or thermal. The range finding system may be ultrasonic, a laser scanner (e.g. Hokuyo urg-04lx) or infrared (e.g. Creative Senz3D). The sensor platform may rotate or pan to gain a full 3-D image. The spray gun is mounted on a motorised one or two axis gun platform allowing the operator to remotely control the application of the material. This may be done directly with a gamepad controller or by the device calculating the required spray pattern to cover the given area.

The control system for application of materials takes information from the range finder, and a nine-degree of freedom motion/tilt sensor to calculate the position of the robotic vehicle relative to the surface being sprayed. This information can then be used to draw on the video feed where the gun is pointing aiding manual spraying by the operator. Or the operator can select an area on the map or video feed and the robotic vehicle automatically calculates the area that needs to be sprayed.

An additional application of the robotic vehicle is for loft and roof insulation. The robotic vehicles of the present disclosure may be used for applying insulation in hard to reach loft and ceiling voids. In another application, the robotic vehicles may be used to apply sound insulation. In particular, the robotic vehicles are suited with assisting in the remote application of sound insulation in voids and cavities, for example between floors of converted period flats.

Additionally, the robotic vehicle may be used to apply preservatives. Anti-fungicides and preservatives can be applied to wood and other materials.

In some industrial applications, the robotic vehicles may be used to apply paint, protective coatings, sealant or carry out other maintenance and repairs to cracked or damaged pipes, storage tanks and other industrial structures.

The robotic vehicle may also or instead be used in building inspection and maintenance applications. This includes: surveying; mapping and investigating hazardous 'crawl spaces' e.g. asbestos surveying or checking wiring; surveying services for example mapping pipe work and checking for leaks; and structural surveys.

Additional applications include infrastructure inspection and maintenance. For example, surveying sewer or gas pipes, inspecting pressure tanks, etc.

For some of these applications, it will be appreciated that the robotic vehicle need not be equipped with the spray gun tool.

As well as spraying insulating foam, it will be appreciated that the robotic vehicle may apply other materials. The robotic vehicle may apply blown mineral wool or cellulose insulation with or without a binding agent so it adheres to a surface. For the blown mineral wool, an adhesive can be added at the nozzle through a jet of air that also acts to propel the insulation.

In some embodiments, the robotic vehicle may apply spray aerogel insulation coatings or sound insulation.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A control system for a robotic device for applying an insulating layer to an underside of a surface of an underfloor cavity, the robotic device including a chassis, a spray gun for spraying an insulating material onto the surface, a camera, a rangefinder, and a data communication module in data communication with the spray gun, the camera and the rangefinder, wherein the control system comprises:

a processor including a transceiver adapted for data communication with the data communication module, whereby to receive data from one or more of the spray gun, the camera, and the rangefinder, wherein the processor is further adapted to:
- display, on an operator display, a video feed from the camera,
- receive an input from an operator selecting an area of the surface shown in the video feed to be sprayed,
- generate control data for movement of the spray gun based on the operator input and the received data, and
- generate a representation of the control data on the video feed of the operator display; and a networked microcontroller adapted to provide control signals for movement of the spray gun according to the control data.

2. A control system as claimed in claim 1, wherein the processor is adapted to automatically generate the control data for the spray gun in response to input received from the operator in combination with the received data from one or more of the spray gun, the rangefinder and a tilt sensor coupled to the robotic device, in order to generate a spray pattern requested by the operator.

3. A general purpose computer programmed to operate as the processor of claim 1.

4. Computer software which programs a general purpose computer to operate as the processor of claim 1.

5. A control system as claimed in claim 1, wherein the spray gun is rotatably coupled to the chassis, wherein the robotic device further includes a motor for controlling a rotational position of the spray gun, and wherein the networked microcontroller is adapted to provide control signals to control the motor to move the spray gun according to the control data.

6. A control system as claimed in claim 5, wherein the spray gun is rotatably coupled to rotate about two axes relative to the chassis, and wherein the robotic device includes a motor for each axis of rotation of the spray gun, and wherein the networked microcontroller is adapted to provide control signals to control the motors to move the spray gun according to a spray pattern requested by the operator.

7. A control system as claimed in claim 1, wherein the representation on the operator display includes information on a position of the spray gun overlaid on the video feed from the camera.

8. A control system as claimed in claim 1, wherein the representation on the operator display includes range information from the rangefinder overlaid on the video feed from the camera.

9. A control system as claimed in claim 8, wherein the robotic device includes four driven wheels, each driven wheel having a wheel motor arranged to drive the driven wheel, and wherein the networked microcontroller is adapted to provide control signals to control each of the wheel motors individually.

10. A control system as claimed in claim 8, wherein the processor is further adapted to automatically generate control data for one or more of the wheel motors in response to input from the operator in combination with received data from the rangefinder, in order to move the robotic device as requested by the operator.

11. A control system as claimed in claim 1, wherein the operator display is provided on a device located remotely from the robotic device and in communication with the robotic device.

* * * * *